(12) United States Patent
Smith et al.

(10) Patent No.: US 7,791,560 B2
(45) Date of Patent: Sep. 7, 2010

(54) IMAGE TRANSFER APPARATUS

(76) Inventors: Mark Anthony Gleeson Smith, QinetiQ Limited Malvern Technology Centre St Andrew's Road, Malvern, Worcestershire WR14 3PS (GB); Stuart David Coomber, QinetiQ Limited Malvern Technology Centre St Andrew's Road, Malvern, Worcestershire WR14 3PS (GB); Andrew Crow, QinetiQ Limited Malvern Technology Centre St Andrew's Road, Malvern, Worcestshire WR14 3PS (GB)

(*) Notice: Subject to any disclaimer, the term of this patent is extended or adjusted under 35 U.S.C. 154(b) by 341 days.

(21) Appl. No.: 12/022,115

(22) Filed: Jan. 29, 2008

(65) Prior Publication Data

US 2008/0247013 A1 Oct. 9, 2008

Related U.S. Application Data

(60) Provisional application No. 60/898,168, filed on Jan. 30, 2007.

(51) Int. Cl.
*G09G 5/00* (2006.01)
(52) U.S. Cl. .......................... 345/1.3; 359/242; 353/30; 348/40; 348/51
(58) Field of Classification Search ................. 359/242; 345/1.3; 353/30; 348/40, 51
See application file for complete search history.

(56) References Cited

U.S. PATENT DOCUMENTS

| | | | |
|---|---|---|---|
| 5,083,854 A | 1/1992 | Zampolin et al. | |
| 5,130,830 A | 7/1992 | Fukushima et al. | |
| 5,187,598 A | 2/1993 | Posluszny et al. | |
| 5,398,042 A | 3/1995 | Hughes | |
| 5,555,115 A | 9/1996 | Mitsuoka et al. | |
| 5,617,203 A | 4/1997 | Kobayashi et al. | |
| 5,912,758 A | 6/1999 | Knipe et al. | |
| 6,016,224 A | 1/2000 | Namiki | |
| 6,348,990 B1 * | 2/2002 | Igasaki et al. | ............... 359/259 |
| 6,437,919 B1 | 8/2002 | Brown | |
| 6,577,429 B1 | 6/2003 | Kurtz et al. | |
| 6,654,156 B1 | 11/2003 | Crossland | |

(Continued)

FOREIGN PATENT DOCUMENTS

EP 0525424 A2 2/1993

(Continued)

OTHER PUBLICATIONS

Fukushima, S., et al., "Ferroelectric liquid-crystal spatial light modulator achieving bipolar image operation and cascadability", Applied Optics, Nov. 10, 1992, pp. 6859-6868, vol. 31, issue 32, Optical Society of America United States of America.

(Continued)

*Primary Examiner*—Alessandro Amari
(74) *Attorney, Agent, or Firm*—Stolowitz Ford Cowger LLP

(57) ABSTRACT

An apparatus includes a light source configured to provide a path of light and a spatial light modulator located in the path of light and configured to modulate the light source. Relay optics are configured to receive the modulated light from the spatial light modulator and to project a computer generated image to a nominal image plane. The light source is configured to illuminate the spatial light modulator with collimated light.

28 Claims, 2 Drawing Sheets

U.S. PATENT DOCUMENTS

| | | |
|---|---|---|
| 6,751,001 B1 | 6/2004 | Tanner et al. |
| 6,930,693 B1 | 8/2005 | Coker |
| 2005/0213182 A1 | 9/2005 | Cossairt et al. |

FOREIGN PATENT DOCUMENTS

| | | |
|---|---|---|
| EP | 0621524 | 10/1994 |
| GB | 2269238 A | 2/1994 |
| GB | 2330471 A | 4/1999 |
| JP | 5027256 A | 2/1993 |
| WO | 99/19767 | 4/1999 |
| WO | 99/46768 | 9/1999 |
| WO | 00/38162 | 6/2000 |
| WO | 00/40018 | 7/2000 |
| WO | 2004038515 | 5/2004 |

OTHER PUBLICATIONS

Perennes, F., and Crossland, W. A., "Optimization of ferroelectric liquid crystal optically addressed spatial light modulator performance", Opt. Eng., Aug. 1997, pp. 2294-2301, vol. 36, issue 8, Society of Photo-Optical Instrumentation Engineers, United States of America.

Yim, et al., "Comparison of operation parameters between binary and analogue switching pixellated light values", Optoelectronics IEEE Proc., Aug. 1998, pp. 236-242, vol. 145, issue 4, The Institution of Engineering and Technology, United Kingdom.

Oapos Brien, D.C. et al.; "Programmable computer generated holograms with large spacebandwidth product" Holographic Systema, Components and Applications, 1993, Fourth International Conference, [Online] Sep. 15, 1993, pp. 216-221, Neuchatel, Switzerland.

* cited by examiner

IMAGE TRANSFER APPARATUS

This application claims priority to U.S. Provisional Application Ser. No. 60/898,168 filed on Jan. 30, 2007, the specification of which is herein incorporated by reference.

FIELD OF USE

An image transfer apparatus including active tiling systems of the type used in holography.

BACKGROUND

In projection displays, for example as used in lecture theatres, a diffuse light source (e.g. a high powered lamp) is used to illuminate an electrically addressed spatial light modulator (EASLM). Projection optics are provided to focus an image of the EASLM to a given image plane, such as a projection screen or a wall. Images formed by one or more EASLMs can be successively transferred to different sub-image regions of an Optically Addressed Spatial Light Modulator (OASLM) using an active tiling™ system. Active tiling systems are described further in U.S. Pat. No. 6,437,919 and U.S. Pat. No. 6,654,156, the specifications of which are herein incorporated by reference.

An active tiling system may include one or more EASLMs that are illuminated with diffuse light. A number of images of each EASLM are formed using replication optics and focused to a single active tiling image plane. An OASLM is placed in the active tiling image plane and sub-regions thereof are selectively sensitized, for example by employing patterned OASLM electrodes or by using an array of shutters to sequentially block certain replicated images. The active tiling technique thus permits sub-regions of the OASLM to be successively optically addressed, thereby allowing an image with a very high pixel count to be constructed. This system is may be used for volumetric imaging, as it enables an OASLM to be written with a highly complex binarized Fourier Transform (FT) of a final desired volumetric image. The image can be displayed to a viewer via an appropriate FT lens or mirror system.

Devices of the type described above require that the image or images of each EASLM are focused at a desired focal plane. Accordingly, the OASLM is located accurately in the active tiling image plane to within the depth of focus of the active tiling optics. For example, if the active tiling system is configured to write 6.6 µm pixels the resulting depth of focus is only around 201 µm. If the desired OASLM pixel size is decreased, the depth of focus would also reduce accordingly.

In systems configured to display very large volumetric images, many active tiling channels are used in parallel to produce massive pixel counts in a single active tiling image plane. A single OASLM, or multiple OASLMs, will occupy this image plane but the entire area of the OASLM or OASLMs must lie within the depth of focus (e.g. 20 µm) of the active tiling channels. It follows that the active tiling channels must all be mutually aligned to produce a common focal plane, and it can be seen that such a requirement will place tight constraints on the design and build (and hence overall cost) of the system.

BRIEF DESCRIPTION OF THE DRAWINGS

The various embodiments will now be described, by way of example only, with reference to the following drawings in which.

DETAILED DESCRIPTION

Figure 1:
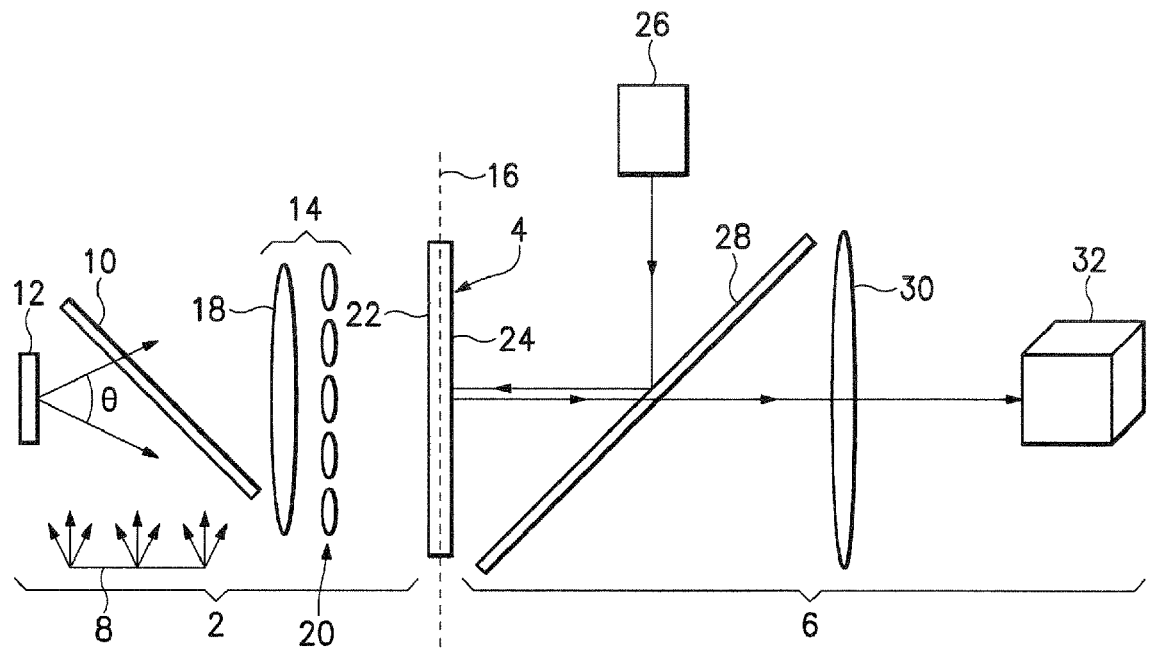
FIG. 1 illustrates an apparatus including active tiling system.

FIG. 1 illustrates an apparatus including an active tiling system 2 configured to produce a dynamic holographic image. The apparatus comprises an active tiling system 2, an OASLM 4, and replay optics 6.

The active tiling system 2 comprises a light source 8, for example diverging light generated by an Argon laser and passed through a spinning diffuser (not shown). The light 8 may be arranged so that it impinges on an EASLM 12 after being reflected from a beam splitter 10. Active tiling optics 14 are provided to direct light modulated by the EASLM 12 to an active tiling (AT) image plane 16. The active tiling optics 14 may comprise a convex collimating lens 18 and a five-by-five lenslet array 20. The lenslet array 20 is arranged as a two dimensional grid such that twenty-five spatially separated images of the EASLM are replicated at the AT image plane 16 in which the OASLM 4 resides. Different arrays may also be used that include a different numbers of lenses.

The OASLM 4 may comprise a bistable liquid crystal light modulating layer and a photosensitive layer (e.g. a photosensor such as amorphous Silicon or some other photoconductor) sandwiched between a pair of glass substrates. The internal surfaces of the glass substrates carry transparent electrodes, which may be formed from layers of Indium Tin Oxide (ITO). A pixilated metal mirror (or a dielectric stack mirror) may also be provided between the photosensitive layer and the liquid crystal layer such that the OASLM has a photosensitive face 22 and an image display face 24. On application of a suitable voltage to the electrode, any optical image impinging on the photosensitive face 22 results in an equivalent image being written (i.e. loaded) in to the liquid crystal material of the image display face 24.

Patterned electrodes may be formed to define twenty-five OASLM segments (corresponding to the twenty-five replicated images formed at the AT image plane) to which a voltage can be independently applied. On application of an appropriate voltage to one of the segments, that particular segment alone will be sensitized and will load the optical image received on its photosensitive face. The OASLM 4 may be located in the AT image plane and the sub-image segments can thus be sequentially and selectively sensitized (by applying appropriate voltages to each patterned electrode in turn) in order to build up an image with a very large pixel count.

Where the application of the device is for volumetric imaging, a binarized Fourier Transform (FT) of a final desired volumetric image may be loaded into the OASLM 4. The volumetric image 32 is then displayed via the replay optics 6. The replay optics 6 may comprise a source of coherent replay illumination 26 that is directed to the image display face of the OASLM 4 via a beam splitter 28. The three dimensional image 32 may then be formed from light reflected from the OASLM using a suitable Fourier Transform (FT) lens 30, or a FT mirror (not shown).

The OASLM 4 in the AT image plane is placed to within the depth of focus of the AT optics. The AT system is configured to write 6.6 µm pixels to an OASLM, wherein the depth of focus associated with the AT image plane is only around 20 µm. If the required OASLM pixel size is decreased (e.g. if the AT optics are configured to provide a greater amount demagnification) so that a higher density of information can be written to the OASLM, the depth of focus will be found to reduce even further. The divergence (i.e. increase angle θ) of the light used in the AT system may be increased as the required OASLM pixel size is reduced.

The shallow depth of focus in apparatus where very large volumetric images are to be displayed may result in many active tiling channels being used in parallel to produce extremely massive pixel count in a common AT image plane. Either a single OASLM, or a number of tiled OASLMs, may occupy the common AT image plane, such that the entire area of the OASLM (which may approach a square meter) lies within the 20 µm depth of focus of the AT optics. The AT channels themselves may be mutually aligned axially to produce a common focal plane. The focus depth of the AT systems therefore places a constraint on the design and build of volumetric imaging systems based on the AT modulation technique. Systems implemented using very high quality optical components are prohibitively expensive.

Figure 2:
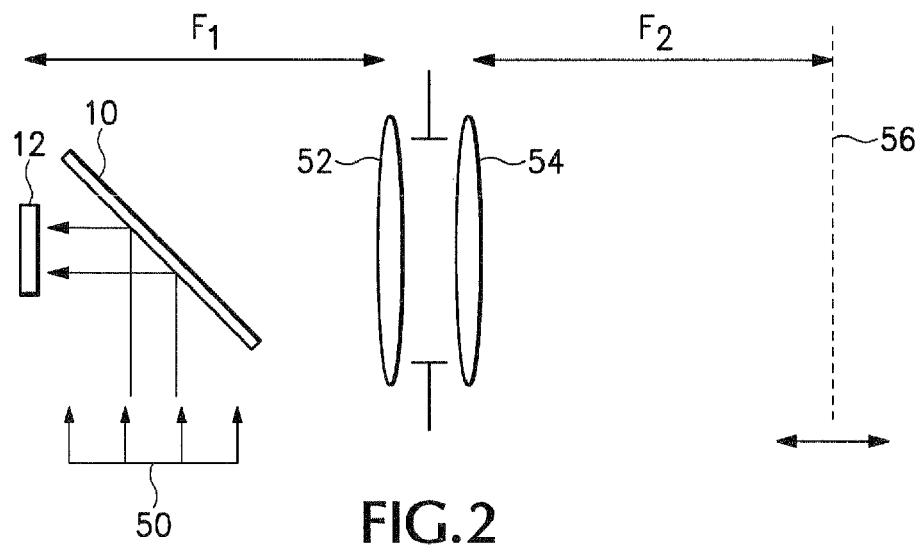
FIG. 2 shows a novel image display system.

Referring to FIG. 2, a novel image transfer apparatus is shown. Components of the apparatus described with reference to FIG. 2 that are common to those of the active tiling system described with reference to FIG. 1 have been assigned like reference numerals.

The image transfer apparatus may employ a source of collimated light 50 to illuminate an EASLM 12 via a beam splitter 10. A first lens 52 of focal length $F_1$ and a second lens 54 of focal length $F_2$ act as relay optics and provide demagnification (M) of $-F_1/-F_2$. In the nominal image plane 56, there will reside a demagnified image of the EASLM 12. An OASLM can be placed many millimeters from the nominal image plane yet still produce the required volumetric image.

Figure 3:
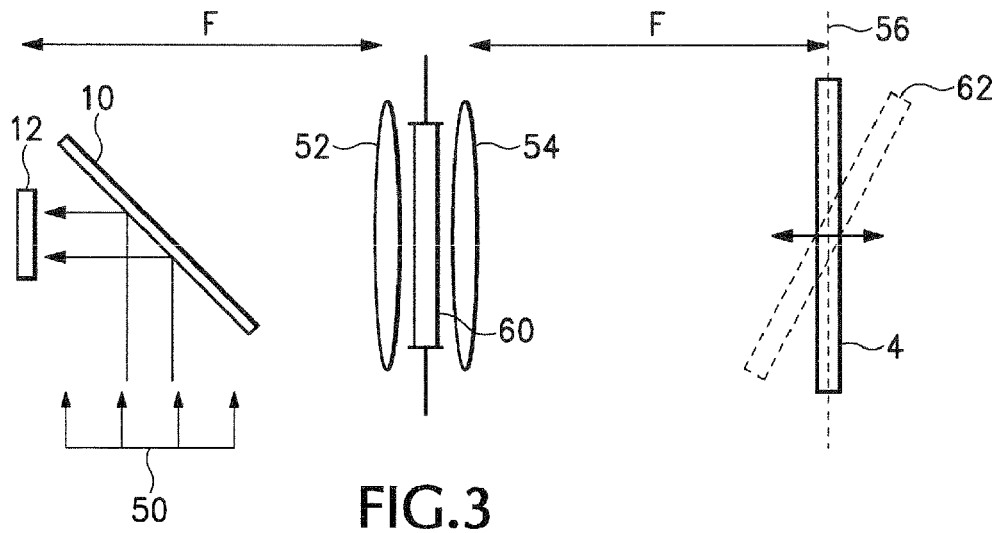
FIG. 3 shows an active tiling system incorporating a diffractive array generator.

FIG. 3 illustrates an active tiling system and is described with reference to FIG. 2. The active tiling system of FIG. 3 may comprise all the components of the system described with reference to FIG. 2, and additionally may include a diffractive array generator (DAG) 60 placed in the pupil plane of the relay optics thereby forming a Fourier correlator.

The DAG 60 may be configured to generate a five by five array of diffraction orders from a single input beam, and thus produce an array of twenty-five images or sub-images of the EASLM at the nominal image plane 56. The DAG 60 may include a Dammann grating or a non-separable DAG, for example. Of course the DAG may be configured to produce different numbers of images or sub-images, including different size arrays.

The use of collimated light may increase the tolerance of OASLM placement in an active tiling system, such that the active tiling system has a larger "effective" depth of focus. A device that uses a novel active tiling system disclosed herein may therefore have greatly reduced design constraints. In dynamic holographic imaging applications where a number of EASLMs are used to tile images onto an OASLM, no decrease in performance is associated with tilting the OASLM away from the nominal image plane, as shown by the tilted OASLM 62 in FIG. 3.

When the EASLM is illuminated with collimated light no increase in the divergence of the illuminating radiation is experienced as the OASLM pixel size is reduced (i.e. as the demagnification power of the active tiling optics was increased). The novel active tiling technique may therefore be more widely employed at a much lower cost than previously thought possible.

In one embodiment, an AT optical system (of the type described above with reference to FIG. 3) may be illuminated with collimated light. As the OASLM is translated through a predetermined distance, no visible image degradation of the volumetric image occurs. However, when the EASLM is illuminated with diffuse (i.e. diverging) light the tolerable OASLM translation depth collapses completely. In other words, diffuse illumination of the EASLM requires the OASLM to be positioned within a close proximity (e.g. 201 Am) of the focal plane of the AT system. Whereas illumination with collimated light as described herein allows much greater freedom in OASLM positioning.

Figure 4:
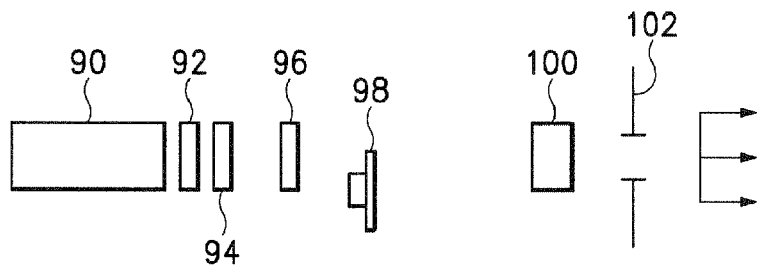
FIG. 4 shows and apparatus configured to provide collimated light.

FIG. 4 shows and apparatus configured to provide collimated light. In one embodiment, a laser 90 is arranged to provide a highly collimated light beam. In one embodiment, the laser 90 comprises an Adlas laser. The output of the laser 90 is passed through a half-wave plate 92, a polarizer 94, an acousto-optic modulator 96, and a spimming diffuser 98 prior to collimation by a collimating lens 100: The apparatus may further comprise a square aperture 102.

Figure 5:
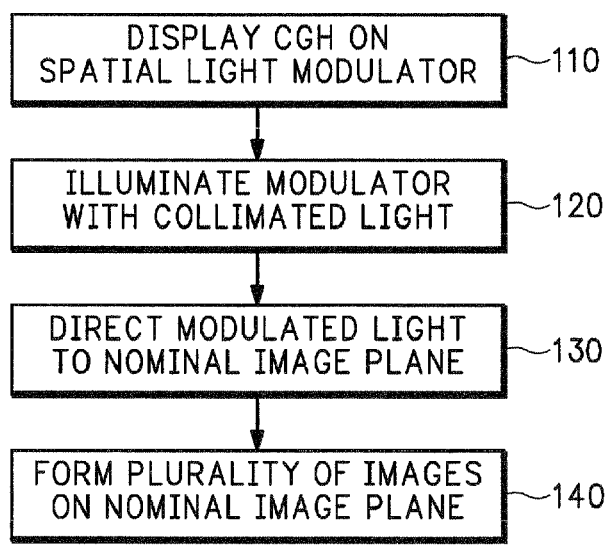
FIG. 5 illustrates an example method of writing information to an OASLM.

FIG. 5 illustrates an example method of writing information to an OASLM. At operation 110, a CGH image is displayed on a spatial light modulator. At operation 120, the spatial light modulator is illuminated with collimated light. At operation 130, modulated light produced by the spatial light modulator is directed to a nominal image plane.

The use of collimated light to illuminate the spatial light modulator provides the effect of relaxing the accuracy with which the OASLM needs to be placed in the nominal image plane. At operation 140, a plurality of images are formed in the nominal image plane. An optically addressed spatial light modulator may be located in or around the nominal image plane. In one embodiment, the OASLM is tilted with respect to the nominal image plane.

In one embodiment, an image transfer apparatus for writing an image to an OASLM is disclosed. The apparatus comprises a light source, spatial light modulator located in the path of light from the light source, and relay optics located to receive modulated light from the spatial light modulator. The relay optics are arranged so as to project an image of the spatial light modulator to a nominal image plane. The light source is configured to illuminate the spatial light modulator with substantially collimated light.

The image transfer apparatus may be configured to produce an image of a computer generated hologram (CGH) displayed by the spatial light modulator at a nominal image plane. The apparatus provides an image having a "visible" depth of focus that is relatively small and the CGH pattern becomes unrecognizable to the eye (looking at it through a travelling microscope) when viewed a particular distance (e.g. more than 20 µm) from the nominal image plane.

However, it has been found that an OASLM can actually be translated many millimeters away from the nominal image plane the apparatus while still replaying the volumetric image without any noticeable degradation. In other words, the OASLM can be translated away from the nominal image plane by a much larger distance (by several orders of magnitude) than expected, with no effect on the volumetric image replayed by the OASLM.

An image is thus being provided that, while not being a recognizable visible copy of the image displayed by the spatial light modulator, contains the information necessary to enable the volumetric image to be produced by the OASLM. When diffuse illumination is instead used, the image relayed by the relay optics goes out of focus over a particular distance, e.g. 201 µm, but the loss of focus also results in the loss of the volumetric image. The OASLM may be located anywhere in or around the nominal image plane of the relay optics. The design tolerances may be relaxed from microns to millimeters.

In one embodiment, the relay optics comprise a replication means such that a plurality of images of the spatial light modulator means (e.g. an EASLM) are provided at the nominal image plane. Replication means may comprise a diffractive array generator (DAG) located in a pupil plane of the relay optics. Provision of replication means, in particular a DAG, may enable two or more images of the spatial light modulator to be formed by the relay optics. For example, a DAG could be used that provides a five by five array of replicated images across the nominal image plane.

In one embodiment, the replication means are incorporated in an active tiling (AT) systems, wherein the replicated images are directed to an OASLM. Portions of the OASLM may be sequentially sensitized (e.g. by using patterned OASLM electrodes or a shutter) such that a high pixel count image, such as a CGH, can be built up on the OASLM from a plurality of successive images displayed on the spatial light modulator. Illumination of the image may be written to the OASLM with a beam of coherent light, wherein the light is subsequently operated on by an optical system. The optical system may be configured to provide a Fourier transformation of the light in producing the volumetric (i.e. three dimensional) image.

The spatial light modulator may be electrically addressable. In other words, the elements of the spatial light modulator may be connected to and addressed by an electronic circuit which allows a fast rate of dynamic image to be produced. In the case of a typical EASLM, the CGH displayed thereby may have spatial frequencies between zero and seventy-seven line pairs per millimeter. The CGH image may also comprise a portion of a larger CGH image.

In one embodiment, the spatial light modulator comprises a liquid crystal spatial light modulator. For example, a liquid crystal electronically addressed spatial light modulator (EASLM) having a thin film transistor (TFT) active back-plane could be employed. Various alternative types of EASLM may also be used, for example digital micro-minor devices (DMDs).

The spatial light modulator may be configured to operate in a reflective mode. Alternatively, the spatial light modulator could be operable in a transmissive mode. Different optical configurations could therefore be implemented using either reflective or transmissive spatial light modulators. In one embodiment, the collimated light source comprises a laser. The use of a laser enables high optical powers to be provided, which is especially important if a large degree of image replication is required.

In another embodiment, a holographic display device comprises an image transfer apparatus and an optically addressed spatial light modulator, wherein the optically addressed spatial light modulator is located in or around the nominal image plane. The image transfer apparatus may write an image to an OASLM that is located within a particular range (e.g. several millimeters) of the nominal image plane of the image transfer apparatus rather than within the depth of focus of the apparatus.

The holographic display device may comprise a single OASLM or a number of tiled OASLMs. In one embodiment, an image is written to the OASLM by a number of image transfer apparatus. The OASLM may be tilted with respect to the nominal image plane of the image transfer apparatus without having any effect on the quality of volumetric image replayed from the OASLM.

The active tiling apparatus and other embodiments described herein may be configured to significantly decrease the tolerance with which an OASLM is located with respect to the nominal image plane. By including multiple channel AT systems, the channels do not need to be mutually axially aligned to within a particular distance (e.g. 20 µm) of each other. Furthermore, the OASLM may be mounted +/−10 µm of a greater distance from the nominal image plane, rather than within +/−10 µm, for example. Accordingly, less mechanical strain is placed on the OASLM, decreasing the likelihood of distortion of the volumetric image.

The term light as used herein may be understood to include all ultraviolet (UV) radiation, visible radiation and infra-red radiation. Furthermore, the various optical components may be understood as being able to generate a variety of wavelengths, or ranges of wavelengths, of light.

Although the above described examples relate mainly to apparatus configured for use in a holographic active tiling system, a person skilled in the art would recognize that the embodiments could also be applied in numerous alternative applications.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles in a preferred embodiment thereof, it should be apparent that the embodiments may be modified in arrangement and detail without departing from such principles. We claim all modifications and variation coming within the spirit and scope of the following claims.

The invention claimed is:

1. An apparatus, comprising:
  a light source configured to provide a path of collimated light, wherein the light source comprises a half-wave plate, a polarizer, an acousto-optic modulator, and a spinning diffuser;
  a spatial light modulator located in the path of light and configured to modulate the light source; and
  relay optics configured to receive the modulated light from the spatial light modulator and to project a portion of a computer generated image to an optically addressable spatial light modulator located approximately at a nominal image plane, wherein portions of the optically addressable spatial light modulator are sequentially sensitized such that the computer image is built up from a plurality of successive images received from a plurality of spatial light modulators, and wherein the light source is configured to illuminate the spatial light modulator with the collimated light.

2. The apparatus according to claim 1, wherein the relay optics additionally comprise a replication assembly configured to replicate the portion of the computer generated image as a plurality of sub-images onto the optically addressable spatial light modulator.

3. The apparatus according to claim 2, wherein the replication assembly comprises a diffractive array generator (DAG) located in a pupil plane of the relay optics.

4. The apparatus according to claim 2 wherein the relay optics comprise a first lens located on one side of the replication assembly and a second lens located on a side of the replication assembly opposite the first lens, wherein the first lens has a first focal length, wherein the second lens has a second focal length, and wherein the relay optics are configured to provide a demagnification of the computer generated image corresponding to a ratio of the first and second focal lengths.

5. The apparatus according to claim 1, wherein the spatial light modulator comprises an electrically addressable spatial light modulator (EASLM).

6. The apparatus according to claim 1, wherein the light source further comprises a laser.

7. The apparatus according to claim 1, wherein the optically addressable spatial light modulator is tilted with respect to the nominal image plane.

8. A method, comprising:
generating a highly collimated light beam from a collimated light source comprising a half-wave plate, a polarizer, an acousto-optic modulator, and a spinning diffuser;
illuminating a spatial light modulator with the collimated light beam;
modulating the collimated light beam; and
directing the modulated light beam to an optically addressable spatial light modulator located approximately at a nominal image plane.

9. The method according to claim 8, further comprising replicating the modulated light beam as a plurality of images formed on the optically addressable spatial light modulator.

10. The method according to claim 9, wherein the optically addressable spatial light modulator is tilted with respect to the nominal image plane.

11. The method according to claim 9, further comprising illuminating the optically addressable spatial light modulator with the modulated light beam to form a three dimensional image.

12. The method according to claim 9, wherein the spatial light modulator operates in a reflective mode.

13. The method according to claim 9, wherein the spatial light modulator operates in a transmissive mode.

14. The method according to claim 8, further comprising generating a computer generated holographic image on the optically addressable spatial light modulator, wherein the computer generated image is built up from a plurality of successive images displayed on the optically addressable spatial light modulator by a plurality of spatial light modulators.

15. The method according to claim 14, further comprising sequentially sensitizing portions of the optically addressable spatial light modulator as the plurality of images are displayed.

16. A system, comprising:
means for generating a highly collimated light beam from a collimated light source comprising a half-wave plate, a polarizer, an acousto-optic modulator, and a spinning diffuser;
means for illuminating a spatial light modulator with the collimated light beam;
means for modulating the collimated light beam;
means for directing the modulated light beam to an image display located approximately at a nominal image plane, wherein a computer generated image is built up from a plurality of successive images displayed on the image display by one or more spatial light modulators; and
means for reflecting light from the image display to form a three dimensional image corresponding to the computer generated image.

17. The system according to claim 16, further comprising:
means for focusing the modulated light to the image display that is located one or more millimeters outside of the nominal image plane.

18. The system according to claim 16, further comprising:
means for maintaining a constant depth of focus of the system regardless of a pixel density of the image display.

19. The system according to claim 16, further comprising:
means for maintaining a constant depth of focus of the system regardless of an angle of tilt of the image display with respect to the nominal image plane.

20. The system according to claim 19, wherein the means for illuminating the spatial light modulator with the collimated light beam further comprises a laser.

21. A computer-readable medium having instructions stored thereon, wherein the instructions are executable by at least one device that cause the at least one device to perform operations comprising:
generating a highly collimated light beam from a collimated light source comprising a half-wave plate, a polarizer, an acousto-optic modulator, and a spinning diffuser;
illuminating a spatial light modulator with the collimated light beam;
modulating the collimated light beam; and
directing the modulated light beam to an optically addressable spatial light modulator located approximately at a nominal image plane, wherein portions of the optically addressable spatial light modulator are sequentially sensitized such that a computer image is built up from a plurality of successive sub-images received from a plurality of spatial light modulators.

22. The computer-readable medium according to claim 21, wherein the operations further comprise:
illuminating the optically addressable spatial light modulator with a read light to form a three dimensional image.

23. The computer-readable medium according to claim 21, wherein the spatial light modulator comprises an electrically addressable spatial light modulator.

24. The computer-readable medium according to claim 21, wherein the collimated light source further comprises a laser.

25. The computer-readable medium according to claim 21, wherein the operations further comprise:
diffracting the modulated light into an array comprising the plurality of successive sub-images; and
directing each of the plurality of successive sub-images onto the optically addressable spatial light modulator.

26. The computer-readable medium according to claim 25, wherein the modulated light is diffracted by a diffractive array generator (DAG), wherein the plurality of successive sub-images are directed by relay optics, and wherein the DAG is located at a pupil plane of the relay optics.

27. The computer-readable medium according to claim 26, wherein a depth of focus of the relay optics remains constant regardless of an angle of tilt of the optically addressable spatial light modulator with respect to the nominal image plane.

28. The computer-readable medium according to claim 27, wherein the depth of focus is one or more millimeters.

* * * * *

UNITED STATES PATENT AND TRADEMARK OFFICE
CERTIFICATE OF CORRECTION

PATENT NO.           : 7,791,560 B2
APPLICATION NO.      : 12/022115
DATED                : September 7, 2010
INVENTOR(S)          : Smith et al.

Page 1 of 1

It is certified that error appears in the above-identified patent and that said Letters Patent is hereby corrected as shown below:

Page 2, item (56), under "Other Publications", in Column 2, Line 12, delete "Systema," and insert -- Systems, --.

Column 7, line 4, in Claim 4, delete "claim 2" and insert -- claim 2, --.

Signed and Sealed this
Twenty-second Day of May, 2012

David J. Kappos
*Director of the United States Patent and Trademark Office*